United States Patent
Kang et al.

(10) Patent No.: US 8,493,362 B2
(45) Date of Patent: Jul. 23, 2013

(54) IMAGE-BASED COORDINATE INPUT APPARATUS AND METHOD UTILIZING BUFFERED IMAGES

(75) Inventors: Teng-Chieh Kang, Luzhou (TW); Chin-Chin Chen, Zhonghe (TW); Chih-Chieh Hsiao, Taichung (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 500 days.

(21) Appl. No.: 12/821,346

(22) Filed: Jun. 23, 2010

(65) Prior Publication Data
US 2011/0102376 A1     May 5, 2011

(30) Foreign Application Priority Data
Oct. 30, 2009 (TW) ................................ 98136826 A

(51) Int. Cl.
    *G06F 3/042*     (2006.01)
(52) U.S. Cl.
    USPC ......................................................... 345/175

(58) Field of Classification Search
    None
    See application file for complete search history.

(56) References Cited

U.S. PATENT DOCUMENTS

| | | | | |
|---|---|---|---|---|
| 6,421,042 | B1* | 7/2002 | Omura et al. | 345/157 |
| 2008/0166022 | A1* | 7/2008 | Hildreth | 382/107 |

* cited by examiner

*Primary Examiner* — Jason Olson
(74) *Attorney, Agent, or Firm* — McClure, Qualey & Rodack, LLP

(57) ABSTRACT

The invention provides an image-based coordinate input apparatus and method for detecting positions of N objects on a coordinate input region at a detecting interval where N equals to 1 or 2. According to the invention, starting at the start of the detecting interval, successive first images at a first view and successive second images at a second view relative to the N objects and a background of the perimeter of the coordinate input region are captured and buffered. The apparatus and method according to the invention judges the number of the N objects and calculates the positions of the N objects on the coordinate input region at the detecting interval in accordance with the buffered successive first images and the buffered successive second images.

12 Claims, 6 Drawing Sheets

IMAGE-BASED COORDINATE INPUT APPARATUS AND METHOD UTILIZING BUFFERED IMAGES

CROSS-REFERENCE TO RELATED APPLICATION

This utility application claims priority to Taiwan Application Serial Number 098136826, filed Oct. 30, 2009, which is incorporated herein by reference.

BACKGROUND OF THE INVENTION

1. Field of the Invention

The invention relates to an image-based coordinate input apparatus and method and, more particularly, to a coordinate input apparatus and method utilizing buffered images and based on images.

2. Description of the Prior Art

Due to the advantages of enabling users to intuitively input coordinate relative to the display devices via touch method, touch screens have become popular input apparatuses equipped by modern display devices. Touch screens have been widely applied to various electronic products having display devices, such as monitors, laptop computers, tablet computers, automated teller machines (ATM), point of sale, tourist guiding systems, industrial control systems, and so on.

Besides conventional resistive-type and conductive-type touch screens which operators have to input in direct contact, coordinate input method utilizing image capturing devices which operators need not to directly contact the screen has also been adopted. Please refer to the U.S. Pat. No. 4,507,557 to see the prior art regarding image-based coordinate input method utilizing image capturing devices, which is not described herein.

Along with the trends of touch screens performing multi-touch function, image-based coordinate input method is also developed to perform multi-touch function. Please refer to U.S. Pat. No. 7,411,575 to see the related prior art. However, image-based coordinate input method needs sufficient computing resource to judge multi-touch input coordinates in real time.

In addition, image-based coordinate input method very possibly could not judge and distinguish the coordinate positions of multi-touch input points at a detecting interval because these multi-touch input coordinates are quite close.

Accordingly, a scope of the invention is to provide an image-based coordinate input apparatus and method. And more particularly, the image-based coordinate input apparatus and method utilize buffered images to judge multi-touch input coordinate locations. Therefore, when the computing resource is insufficient or the system is not capable of judging and distinguishing the multi-touch input coordinate positions in real time, the image-based coordinate input apparatus and method according to the invention can recall the buffered images to judge the multi-touch coordinate positions.

SUMMARY OF THE INVENTION

An image-based coordinate input apparatus according to a preferred embodiment of the invention is used for detecting positions of N objects on a coordinate input region at a detecting interval, where N equals to 1 or 2. The image-based coordinate input apparatus includes a first image capturing device, a second image capturing device, a buffer, and a processing unit. The first image capturing device is disposed at a first location on the perimeter of the coordinate input region, and is used for starting at the start of the detecting interval to capture successive first images relative to the N objects and a background of the perimeter of the coordinate input region. The second image capturing device is disposed at a second location on the perimeter of the coordinate input region, and is used for starting at the start of the detecting interval to capture successive second images relative to the N objects and the background of the perimeter of the coordinate input region. The buffer is electrically connected to the first image capturing device and the second image capturing device respectively. The buffer buffers the successive first images and the successive second images. The processing unit is electrically connected to the buffer. The processing unit accesses the successive first images and the successive second images, judges a variation in accordance with the successive first images and/or the successive second images, and calculates the positions of the N objects on the coordinate input region at the detecting interval in accordance with the variation, the first images and the second images.

An image-based coordinate input method according to a preferred embodiment of the invention is used for detecting positions of N objects on a coordinate input region at a detecting interval, where N equals to 1 or 2. The image-based coordinate input method, firstly, at a first view, starts at the start of the detecting interval to capture successive first images relative to the N objects and a background of the perimeter of the coordinate input region. Then the image-based coordinate input method, at a second view different from the first view, starts at the start of the detecting interval to capture successive second images relative to the N objects and the background of the perimeter of the coordinate input region. After that, the image-based coordinate input method buffers the successive first images and the successive second images. Afterwards, image-based coordinate input method judges a variation in accordance with the stored successive first images and/or the buffered successive second images. Finally, the image-based coordinate input method calculates the positions of the N objects on the coordinate input region at the detecting interval in accordance with the variation, the first images and the second images.

In an embodiment, the variation indicates that the projections of the N objects on the first images or the second images extend with time. In this condition, the positions of the N objects on the coordinate input region at the detecting interval are judged and calculated in accordance with the variation, the first images and the second images.

In an embodiment, the variation indicates that the projections of the N objects on the first images or the second images are two dark blocks transferred from one dark block. In this condition, the positions of the N objects on the coordinate input region at the detecting interval are judged and calculated in accordance with the variation, the first images and the second images.

In an embodiment, the first images and the second images provide two sets of candidate positions for calculation. The variation indicates that one position of one set of candidate positions between the two sets of candidate positions is substantially stationary with time. In this condition, the set of candidate positions with the stationary position are judged and calculated as being the positions of the N objects on the coordinate input region at the detecting interval in accordance with the variation, the first images and the second images.

In an embodiment, the first images and the second images provide two sets of candidate positions for calculation. The variation indicates that a geometric parameter associated with one set of candidate positions between the two sets of candidate positions is substantially stationary with time. In this condition, the set of candidate positions with the stationary geometric parameter are judged and calculated as being the positions of the N objects on the coordinate input region at the detecting interval in accordance with the variation, the first images and the second images.

The advantage and spirit of the invention may be understood by the following recitations together with the appended drawings.

BRIEF DESCRIPTION OF THE APPENDED DRAWINGS

DETAILED DESCRIPTION OF THE INVENTION

The invention provides an image-based coordinate input apparatus and method. And more particularly, the image-based coordinate input apparatus and method according to the invention utilize buffered images to judge multi-touch input coordinate positions. Accordingly, when the computing resource is insufficient or the system is not capable of judging and distinguishing the multi-touch input coordinate positions in real time, the image-based coordinate input apparatus and method according to the invention can recall the buffered images to judge the multi-touch coordinate locations. With the following detailed explanations of the preferred embodiments of judging and distinguishing input of two points, the features, spirits, advantages, and feasibility of the multi-touch input according to the invention will be hopefully well described.

Figure 1:
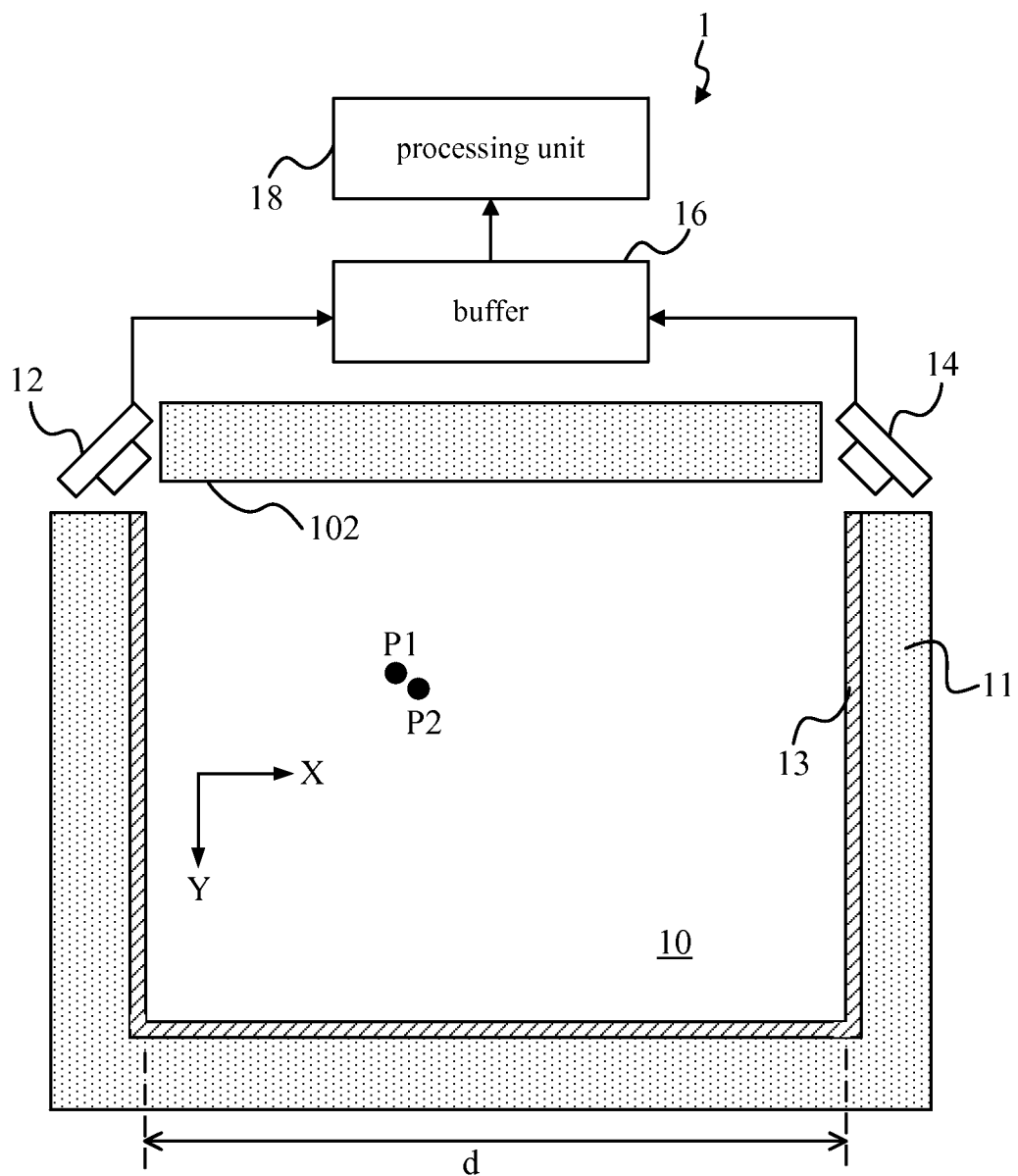
FIG. 1 is a schematic diagram illustrating the image-based coordinate input apparatus according to an embodiment of the invention.

Please refer to FIG. 1. FIG. 1 is a schematic diagram illustrating the image-based coordinate input apparatus 1 according to an embodiment of the invention. The image-based coordinate input apparatus 1 according to the invention is used for detecting positions (P1 and P2) of N objects (such as fingers, stylus, etc.) on a coordinate input region 10 at a detecting interval, where N equals to 1 or 2.

As shown in FIG. 1, the image-based coordinate input apparatus 1 includes a first image capturing device 12, a second image capturing device 14, a buffer 16, and a processing unit 18.

As well as shown in FIG. 1, the image-based coordinate input apparatus 1 also includes a frame 11 protruding and surrounding the coordinate input region 10. The first image capturing device 12 is disposed at a first location on the perimeter 102 of the coordinate input region 10, the upper-left corner of frame 11 as shown in FIG. 1. The second image capturing device 14 is disposed at a second location on the perimeter 102 of the coordinate input region 10, the upper-right corner of frame 11 as shown in FIG. 1. Similar to conventional image-based coordinate input apparatus, the image-based coordinate input apparatus 1 according to the invention also includes point light sources installed on the upper-left and upper-right corners respectively (not shown in FIG. 1). In this architecture, the image-based coordinate input apparatus 1 also includes rectro-reflective devices 13 installed on three inner sides of the frame 11. The rectro-reflective devices 13 are used for rectro-reflecting the light emitted by the point light source disposed on the upper-left corner to the first image capturing device 12 and retro-reflecting the light emitted by the point light source disposed on the upper-right corner to the second image capturing device 14, so that the first image capturing device 12 and second image capturing device 14 can capture images relative to a background of the perimeter 104 of the coordinate input region 10 and projections of objects on the images. In addition, in prior art relating to image-based coordinate input apparatus, many designs of various light source types, reflecting devices and light guiding devices have been proposed. An example is the design which disposes line light sources at three inner sides of the perimeter of the coordinate input region in substitution for the point light sources without need of rectro-reflective devices. It is worth noting that the image-based coordinate input apparatus and method according to the invention can be applied to designs adopting aforesaid various light sources, reflecting devices and light guiding devices.

Particularly, the first image capturing device 12 is used for starting at the start of the detecting interval to capture successive first images relative to the N objects and a background of the perimeter 102 of the coordinate input region 10. Similarly, the second image capturing device 14 is used for starting at the start of the detecting interval to capture successive second images relative to the N objects and the background of the perimeter 102 of the coordinate input region 10.

The buffer 16 is electrically connected to the first image capturing device 12 and the second image capturing device 14 respectively. The buffer 16 buffers the successive first images and the successive second images.

The processing unit 18 is electrically connected to the buffer 16. The processing unit 18 accesses the successive first images and the successive second images. The processing unit 18 also judges a variation in accordance with the successive first images and/or the successive second images. The processing unit 18 also calculates the positions of the N objects on the coordinate input region 10 at the detecting interval in accordance with the variation, the first images and the second images.

Figure 2:
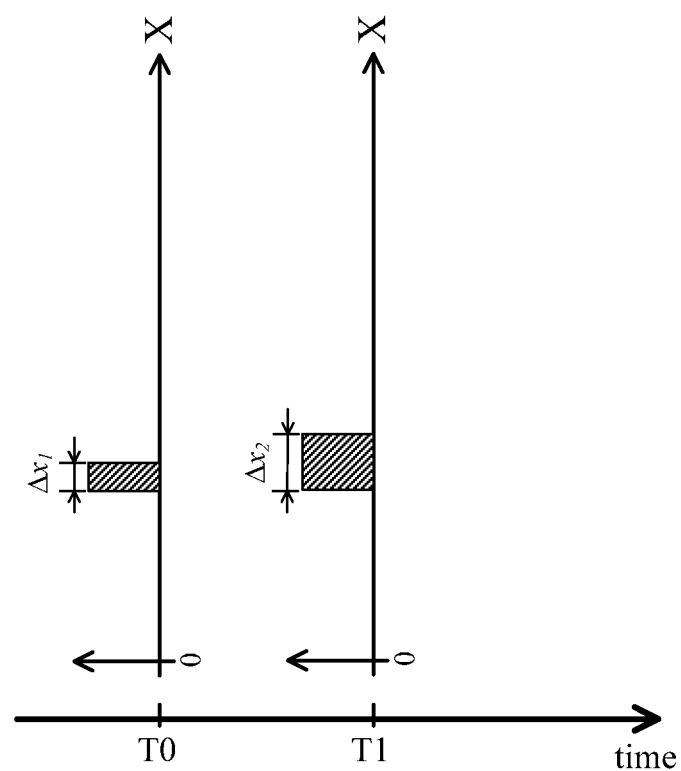
FIG. 2 is a schematic diagram illustrating an example of images captured at time points T0 and T1, where the projections on the images extend with time.

Regarding the condition that the N objects are two objects located on the coordinate input region 10 in turn and the two objects are very close to each other, in an embodiment, the variation indicates that the projections of the N objects on the first images or the second images extend with time. For instance, as shown in FIG. 2, at T0 time point the width of the projection of the imaged image (first image or second image) is $\Delta x_1$; at T1 time point the projection of the same imaged image is not moved and the width of the projection is $\Delta x_2$, and the processing unit 18 will judge that projections of the images extend with time. In this condition, the positions of the N objects on the coordinate input region 10 at the detecting interval are judged and calculated in accordance with the variation, the first images and the second images. It is emphasized that aforesaid judgment on the input of two points by the projections extending with time is also suitable for the input of more than two points.

Figure 3:
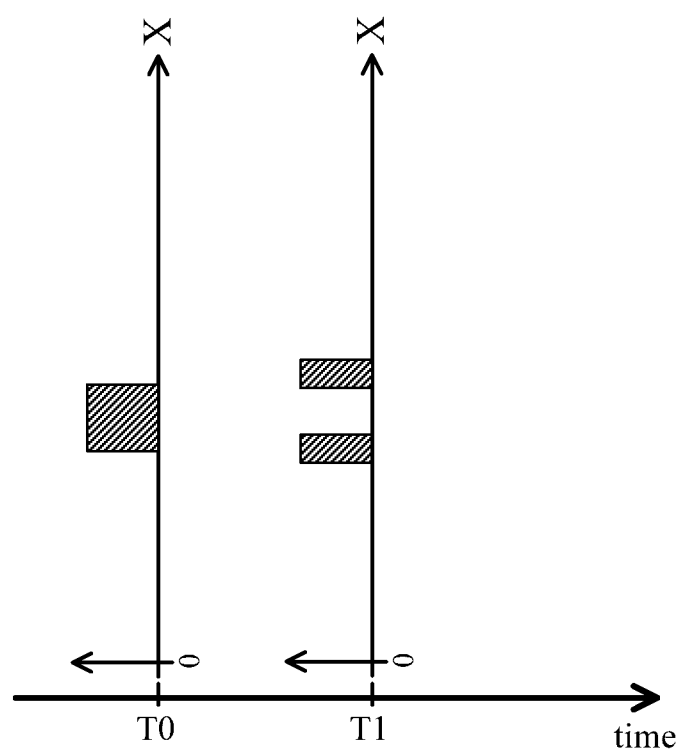
FIG. 3 is a schematic diagram illustrating an example of images captured at time points T0 and T1, where the projections on the images are two dark blocks transferred from one dark block with time.

Regarding the condition that the N objects are two objects located on the coordinate input region 10 simultaneously or in turn and the two objects are very close to each other, in an embodiment, the variation indicates that the projections of the N objects on the first images or the second images are two dark blocks transferred from one dark block. For instance, as shown in FIG. 3, at T0 time point the projection of the imaged image (the first image or the second image) is a dark block; at T1 time point the projection of the same imaged image becomes two dark blocks. In this condition, and the positions of the N objects on the coordinate input region 10 at the detecting interval are judged and calculated in accordance with the variation, the first images and the second images. It is emphasized that aforesaid judgment on the input of two points by the change in number of dark blocks of the projection is also suitable for the input of more than two points.

Figure 4:
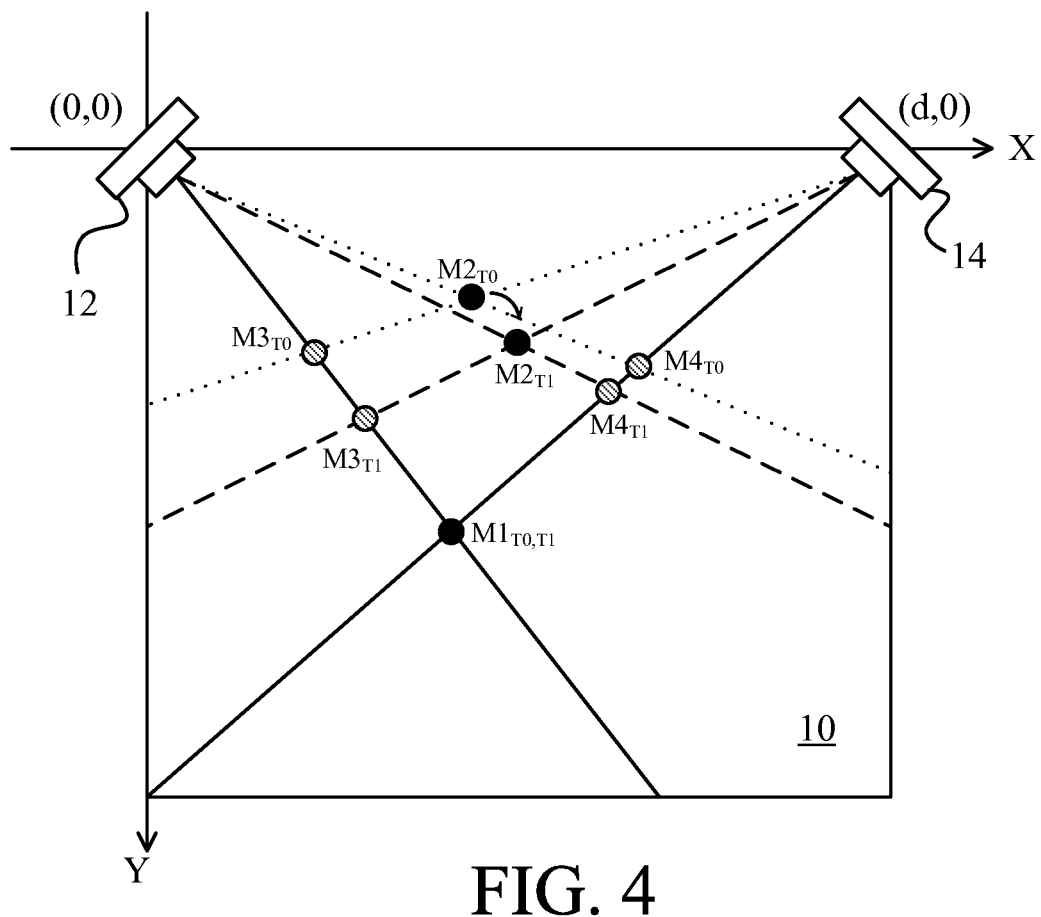
FIG. 4 is a schematic diagram illustrating the candidate positions on the coordinate input region at time points T0 and T1, where the position M1 is substantially stationary with time.

As to the condition that the computing resource is insufficient to judge and distinguish the positions of the two objects located on the coordinate input region 10 in real time, in an embodiment, the first images and the second images provide two sets of candidate positions for calculation. The variation indicates that one position of one set of candidate positions between the two sets of candidate positions is substantially stationary with time. For instance, as shown in FIG. 4, at T0 there are two sets of candidate positions ($M1_{T0}$, $M2_{T0}$) and ($M3_{T0}$, $M4_{T0}$); at T1 there are also two candidate positions ($M1_{T1}$, $M2_{T1}$) and ($M3_{T1}$, $M4_{T1}$). Particularly, $M1_{T0}$ and $M1_{T1}$ have identical coordinate. By recalling the first images and the second images, the processing unit 18 will judge that the position M1 is stationary with time. In this condition, the set of candidate positions with the stationary position are judged and calculated as being the positions of the N objects on the coordinate input region 10 at the detecting interval in accordance with the variation, the first images and the second images, as ($M1_{T0}$, $M2_{T0}$) shown in FIG. 4. It is emphasized that aforesaid judgment on the input of two points by a position of candidate positions substantially stationary with time is also suitable for the input of more than two points.

Figure 5:
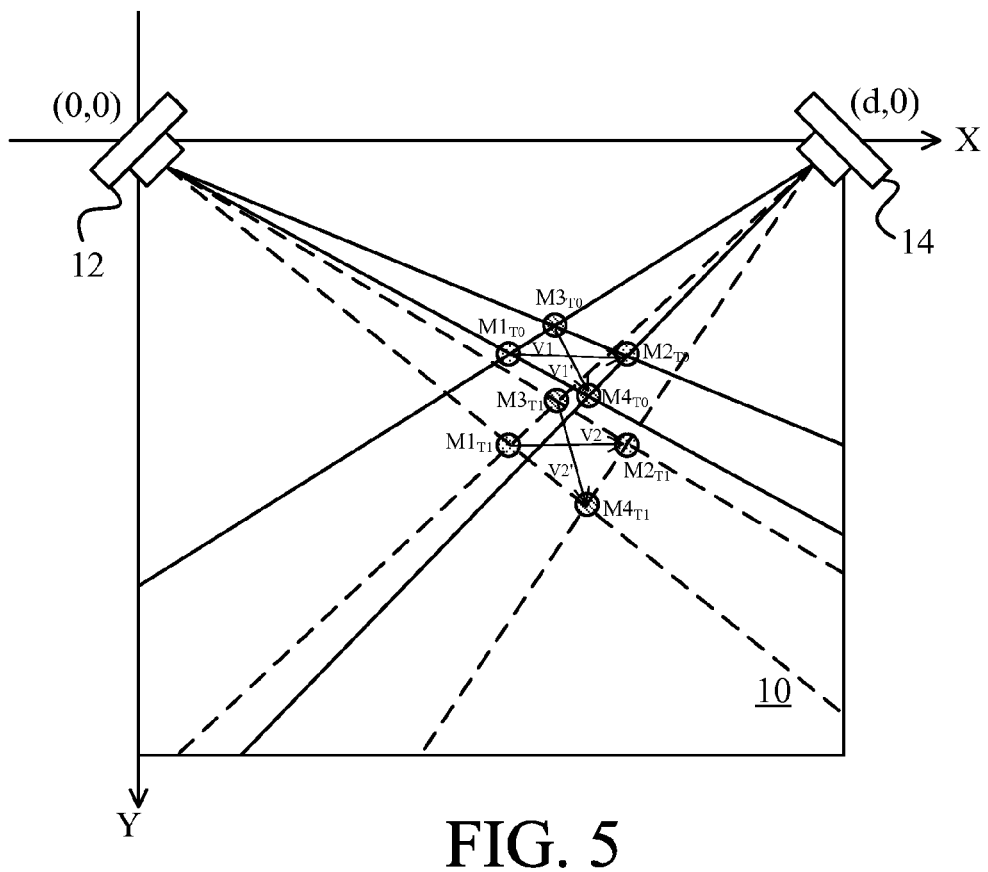
FIG. 5 is a schematic diagram illustrating the candidate positions on the coordinate input region at time points T0 and T1, where vector between the position M1 and the position M2 is substantially stationary with time.

As to the condition that the computing resource is insufficient to judge and distinguish the positions of the two objects located on the coordinate input region 10 in real time, in an embodiment, the first images and the second images provide two sets of candidate positions for calculation. The variation indicates that a geometric parameter associated with one set of candidate positions between the two sets of candidate positions is substantially stationary with time. For instance, as shown in FIG. 5, at T0 there are two sets of candidate positions ($M1_{T0}$, $M2_{T0}$) and ($M3_{T0}$, $M4_{T0}$); at T1 there are also two candidate positions ($M1_{T1}$, $M2_{T1}$) and ($M3_{T1}$, $M4_{T1}$). There is a vector V1 between $M1_{T0}$ and $M2_{T0}$; there is a vector V2 between $M3_{T0}$ and $M4_{T0}$; there is a vector V1' between $M1_{T1}$ and $M2_{T1}$; and there is a vector V2' between $M3_{T1}$ and $M4_{T1}$. Particularly, the difference between V1 and V1' is quite small and the difference between V2 and V2' is obvious. In this condition, the set of candidate positions with the stationary geometric parameter are judged and calculated as being the positions of the N objects on the coordinate input region 10 at the detecting interval in accordance with the variation, the first images and the second images, as ($M1_{T0}$, $M2_{T0}$) shown in FIG. 5. It is emphasized that aforesaid judgment on the input of two points by the geometric parameter associated with one set of candidate positions between sets of candidate positions substantially stationary with time is also suitable for the input of more than two points. In practice, besides the vector between said one set of candidate positions, the distance between said one set of candidate positions can also be adopted to be the geometric parameter of one set of candidate positions for judgment.

Figure 6:
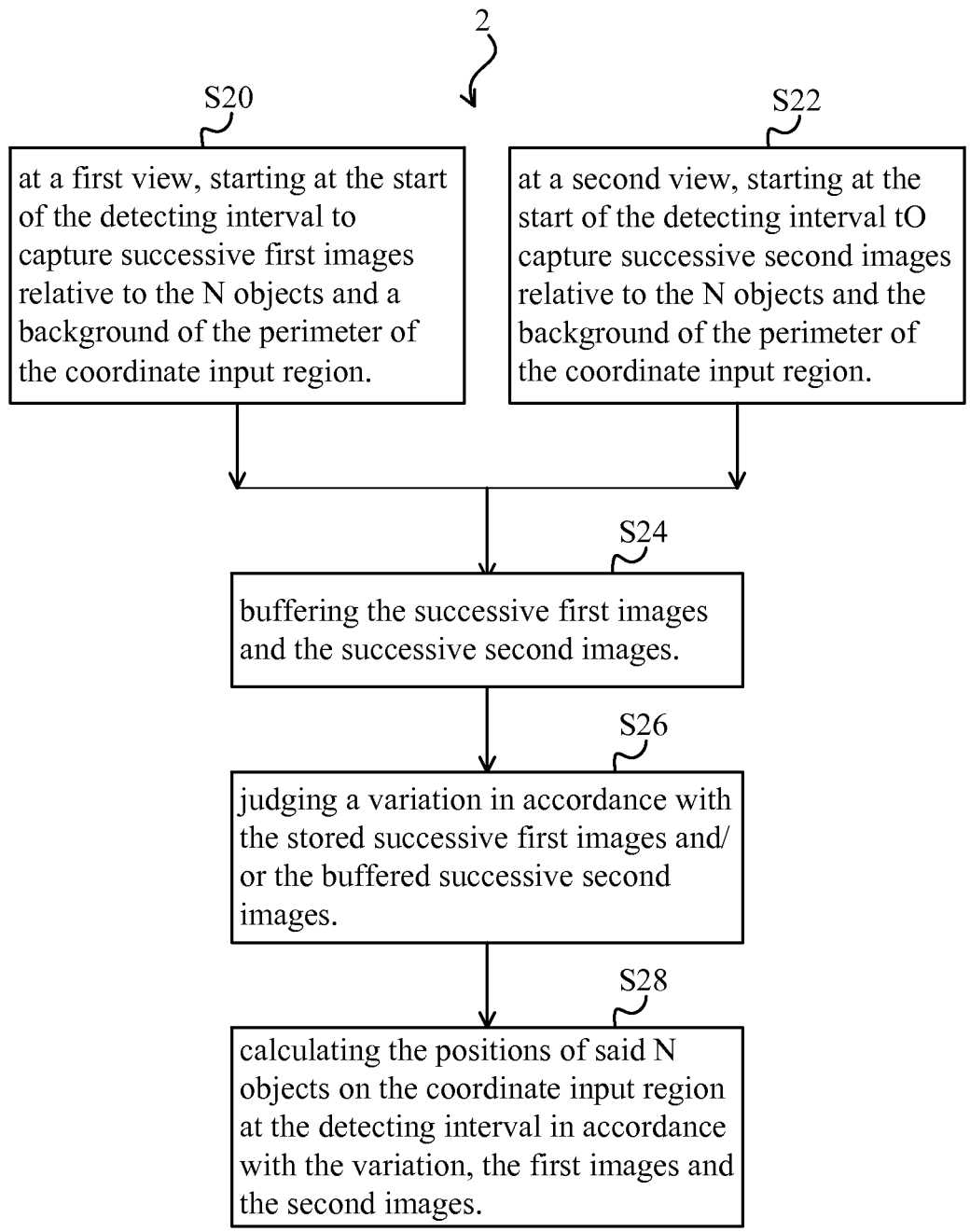
FIG. 6 shows a flow chart illustrating the image-based coordinate input method according to a preferred embodiment of the invention.

Please refer to FIG. 6. FIG. 6 shows a flow chart illustrating the image-based coordinate input method 2 according to a preferred embodiment of the invention. The image-based coordinate input method 2 according to the invention is used for detecting positions of N objects on a coordinate input region at a detecting interval, where N equals to 1 or 2.

As shown in FIG. 6, the image-based coordinate input method 2 according to the invention, firstly, performs step S20 and step S22 simultaneously. In step S20, the image-based coordinate input method 2, at a first view, starts at the start of the detecting interval to capture successive first images relative to the N objects and a background of the perimeter of the coordinate input region. In step S22, the image-based coordinate input method 2, at a second view different from the first view, starts at the start of the detecting interval to capture successive second images relative to the N objects and the background of the perimeter of the coordinate input region.

After that, the image-based coordinate input method 2 according to the invention performs step S24 to buffer the successive first images and the successive second images.

Afterwards, image-based coordinate input method 2 according to the invention performs step S26 to judge a variation in accordance with the stored successive first images and/or the buffered successive second images.

Finally, the image-based coordinate input method 2 performs step S28 to calculate the positions of the N objects on the coordinate input region at the detecting interval in accordance with the variation, the first images and the second images.

In an embodiment, the variation judged in step S26 indicates that the projections of the N objects on the first images or the second images extend with time, where N equals to 2. And in step S28, the positions of the two objects on the coordinate input region at the detecting interval are judged and calculated in accordance with the variation, the first images and the second images. It is emphasized that aforesaid judgment on the input of two points by the projections extending with time is also suitable for the input of more than two points.

In an embodiment, the variation judged in step S26 indicates that the projections of the N objects on the first images or the second images are two dark blocks transferred from one dark block, where N equals 2. And in step S26, the positions of the N objects on the coordinate input region at the detecting interval are judged and calculated in accordance with the variation, the first images and the second images. It is emphasized that aforesaid judgment on the input of two points by the change in number of dark blocks of the projection is also suitable for the input of more than two points.

In an embodiment, the first images and the second images provide two sets of candidate positions for calculation. The variation judged in step S26 indicates that one position of one set of candidate positions between the two sets of candidate positions is substantially stationary with time. And in step S28, the set of candidate positions with the stationary position are judged and calculated as being the positions of the N objects on the coordinate input region at the detecting interval in accordance with the variation, the first images and the second images. It is emphasized that aforesaid judgment on the input of two points by a position of candidate positions substantially stationary with time is also suitable for the input of more than two points.

In an embodiment, the first images and the second images provide two sets of candidate positions for calculation. The variation judged in step S26 indicates that a geometric parameter associated with one set of candidate positions between the two sets of candidate positions is substantially stationary with time. An in step S28, the set of candidate positions with the stationary geometric parameter are judged and calculated as being the positions of the N objects on the coordinate input region at the detecting interval in accordance with the variation, the first images and the second images. It is emphasized that aforesaid judgment on the input of two points by the geometric parameter associated with one set of candidate positions between sets of candidate positions substantially stationary with time is also suitable for the input of more than two points. In practice, besides the vector between said one set of candidate positions, the distance between said one set of candidate positions can also be adopted to be the geometric parameter of one set of candidate positions for judgment.

To sum up, the image-based coordinate input apparatus and method according to the invention can recall buffered images to judge the multi-touch coordinate positions even though the computing resource is insufficient or the system is not capable of judging and distinguishing the multi-touch input coordinate positions in real time.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image-based coordinate input apparatus for detecting positions of N objects on a coordinate input region at a detecting interval, N equaling to 1 or 2, said image-based coordinate input apparatus comprising:
    a first image capturing device, disposed at a first location on the perimeter of the coordinate input region, for starting at the start of the detecting interval to capture successive first images relative to the N objects and a background of the perimeter of the coordinate input region;
    a second image capturing device, disposed at a second location on the perimeter of the coordinate input region, for starting at the start of the detecting interval to capture successive second images relative to the N objects and the background of the perimeter of the coordinate input region;
    a buffer, electrically connected to the first image capturing device and the second image capturing device respectively, for buffering the successive first images and the successive second images; and
    a processing unit, electrically connected to the buffer, for accessing the successive first images and the successive second images, judging a variation in accordance with the successive first images and the successive second images, and calculating the positions of said N objects on the coordinate input region at the detecting interval in accordance with the variation, the first images and the second images.

2. The image-based coordinate input apparatus of claim 1, wherein the variation indicates that the projections of the N objects on the first images or the second images extend with time, and the processing unit calculates the positions of said N objects on the coordinate input region at the detecting interval in accordance with the variation, the first images and the second images.

3. The image-based coordinate input apparatus of claim 1, wherein the variation indicates that the projections of the N objects on the first images or the second images are two dark blocks transferred from one dark block, and the processing unit calculates the positions of said N objects on the coordinate input region at the detecting interval in accordance with the variation, the first images and the second images.

4. The image-based coordinate input apparatus of claim 1, wherein the first images and the second images provide two sets of candidate positions for calculation of the processing unit, the variation indicates that one position of one set of candidate positions between said two sets of candidate positions is substantially stationary with time, and the processing unit calculates said set of candidate positions with said stationary position as being the positions of said N objects on the coordinate input region at the detecting interval in accordance with the variation, the first images and the second images.

5. The image-based coordinate input apparatus of claim 1, wherein the first images and the second images provide two sets of candidate positions for calculation of the processing unit, the variation indicates that a geometric parameter associated with one set of candidate positions between said two sets of candidate positions is substantially stationary with time, and the processing unit calculates said set of candidate positions with said stationary geometric parameter as being the positions of said N objects on the coordinate input region at the detecting interval in accordance with the variation, the first images and the second images.

6. The image-based coordinate input apparatus of claim 5, wherein the geometric parameter associated with said one set of candidate positions is a vector or a distance between said one set of candidate positions.

7. An image-based coordinate input method for detecting positions of N objects on a coordinate input region at a detecting interval, N equaling to 1 or 2, said image-based coordinate input method comprising the steps of:
    (a) at a first view, starting at the start of the detecting interval to capture successive first images relative to the N objects and a background of the perimeter of the coordinate input region;
    (b) at a second view different from the first view, starting at the start of the detecting interval to capture successive second images relative to the N objects and the background of the perimeter of the coordinate input region;
    (c) buffering the successive first images and the successive second images;
    (d) judging a variation in accordance with the buffered successive first images and the buffered successive second images; and
    (e) calculating the positions of said N objects on the coordinate input region at the detecting interval in accordance with the variation, the first images and the second images.

8. The image-based coordinate input method of claim 7, wherein the variation judged in step (d) indicates that the projections of the N objects on the first images or the second images extend with time, and in step (e), the positions of said N objects on the coordinate input region at the detecting interval are calculated in accordance with the variation, the first images and the second images.

9. The image-based coordinate input method of claim 7, wherein the variation judged in step (d) indicates that the projections of the N objects on the first images or the second images are two dark blocks transferred from one dark block, and in step (e), the positions of said N objects on the coordinate input region at the detecting interval are calculated in accordance with the variation, the first images and the second images.

10. The image-based coordinate input method of claim 7, wherein the first images and the second images provide two sets of candidate positions for calculation of the processing unit, the variation judged in step (d) indicates that one position of one set of candidate positions between said two sets of candidate positions is substantially stationary with time, and in step (e), said set of candidate positions with said stationary position are calculated as being the positions of said N objects on the coordinate input region at the detecting interval in accordance with the variation, the first images and the second images.

11. The image-based coordinate input method of claim 7, wherein the first images and the second images provide two sets of candidate positions for calculation of the processing unit, the variation judged in step (d) indicates that a geometric parameter associated with one set of candidate positions between said two sets of candidate positions is substantially stationary with time, and in step (e), said set of candidate positions with said stationary geometric parameter are calculated as being the positions of said N objects on the coordinate input region at the detecting interval in accordance with the variation, the first images and the second images.

12. The image-based coordinate input method of claim 11, wherein the geometric parameter associated with said one set of candidate positions is a vector or a distance between said one set of candidate positions.

* * * * *